United States Patent [19]

Kawajiri

[11] Patent Number: 4,549,239
[45] Date of Patent: Oct. 22, 1985

[54] HEAD CARRIAGE FOR USE IN A MAGNETIC RECORDING MACHINE

[75] Inventor: Yoshio Kawajiri, Zama, Japan

[73] Assignee: Ricoh Company, Ltd., Japan

[21] Appl. No.: 323,029

[22] Filed: Nov. 19, 1981

[30] Foreign Application Priority Data

Nov. 19, 1980 [JP] Japan ............................. 55-161927
Nov. 29, 1980 [JP] Japan ............................. 55-168179

[51] Int. Cl.⁴ .................... G11B 5/54; G11B 21/22
[52] U.S. Cl. .................................. 360/105; 360/104
[58] Field of Search ........................... 360/104–106, 360/102–103, 97–99, 133, 135

[56] References Cited

U.S. PATENT DOCUMENTS

| | | | |
|---|---|---|---|
| 4,151,573 | 4/1979 | Tandon et al. | 360/105 X |
| 4,167,766 | 9/1979 | Chau | 360/104 |
| 4,206,489 | 6/1980 | Manzke et al. | 360/105 |
| 4,291,350 | 9/1981 | King et al. | 360/104 |
| 4,306,258 | 12/1981 | Higashiyama et al. | 360/104 X |
| 4,306,260 | 12/1981 | Maeda et al. | 360/105 |

Primary Examiner—John H. Wolff
Attorney, Agent, or Firm—Guy W. Shoup

[57] ABSTRACT

A head carriage for use in a contact-type magnetic recording/reproducing system, in particular a floppy disc system, comprises a carriage main body, a magnetic head fixedly mounted on the carriage main body and a resiliently supported arm for carrying thereon either another magnetic head for double-sided operation or a pressure pad for single-sided operation. In one aspect of the present invention, linear coefficients of expansions of various parts of the head carriage are determined so as to maintain a proper alignment between the two magnetic heads which are disposed in opposed relationship. In another aspect of the present invention, there is provided a specifically shaped pressure contact member for supporting a pressure pad to keep a desired contact condition between the magnetic head and a recording medium.

3 Claims, 7 Drawing Figures

HEAD CARRIAGE FOR USE IN A MAGNETIC RECORDING MACHINE

BACKGROUND OF THE INVENTION

1. Field of the Invention

This invention relates to a head carriage of a magnetic recording apparatus and in particular to a head carriage for use with flexible recording media such as floppy discs.

2. Description of the Prior Art

Floppy disc systems are well known in the art. In floppy disc systems, use is made of a flexible recording medium, so-called floppy disc, for recording information thereon. In modern floppy disc systems, use is made of double-sided discs in which both sides of the discs are used for recording, thereby increasing recording capacity. A head carriage, carrying thereon a magnetic head, which is adapted to a single-sided floppy disc system may not be directly applicable to a double-sided floppy disc system. Thus, it is desirable that the head carriage is comprised of components, a majority of which is commonly applicable to the single-sided and double-sided floppy disc systems. In other words, in view of the fact that there are now single-sided and double-sided floppy disc systems in the market, the preferred structure of the head carriage is such that it requires a minimum number of parts to be replaced when application is changed from one to the other.

In double-sided floppy disc systems, it requires that a pair of magnetic heads be disposed in opposed relationship. Thus, the alignment between the two magnetic heads is critical with respect to the recording track on the floppy disc. In particular, it is common practice to form the head carriage from a resin material for the ease of manufacture. Misalignment between the two magnetic heads may easily result from uneven expansion of the head carriage due to heat.

It is also to be noted that in the single-sided mode, the contact between the magnetic head and the floppy disc is vital in obtaining excellent recording performance. In order that the magnetic head keeps a good contact condition with the floppy disc at all times during operation, there must be provided a pressure pad which lightly pushes the floppy disc against the magnetic head. It is desirable that such pressure pad is capable of keeping a desired contact condition between the magnetic head and the floppy disc.

SUMMARY OF THE INVENTION

In accordance with the present invention, there is provided an improved head carriage for use in a double-sided recording system, which comprises a carriage main body which is supported to be movable in a reciprocating manner, a first magnetic head fixedly mounted on said carriage main body; a second magnetic head disposed in opposed relation with respect to said first magnetic head; a movable arm on which said second magnetic head is fixedly mounted, said movable arm being resiliently biased such that said first and second magnetic heads together impart a light contact force to a recording medium located therebetween; and alignment adjusting means fixedly mounted on said carriage main body for supporting said movable arm thereby proper alignment between said first and second magnetic heads is maintained at all times. When the carriage main body and the movable arm are made of different materials having different linear expansion coefficients, the alignment adjusting means should be formed by a material, the linear expansion coefficient of which can cancel the effects due to the difference in linear expansion coefficient between the carriage main body and the movable arm.

In accordance with another aspect of the present invention, there is provided a head carriage for use in a magnetic recording system, which comprises a carriage main body which is supported to be movable in a reciprocating manner, a magnetic head fixedly mounted on said carriage main body; a movable arm movably supported by said carriage main body; and pressure contact means loosely mounted on said movable arm in opposed relation with said magnetic head thereby said movable arm is resiliently biased such that said magnetic head and pressure contact means together impart a light contact force to the floppy disc located therebetween. Preferably, the movable arm includes a needle and the pressure contact means includes a support plate having thereon a pressure pad which may be brought into contact with the floppy disc, said support plate being loosely mounted on said movable arm and having a receiving section, whereby said support plate may take a desired orientation with the tip of said needle in contact with said receiving section thereby keeping a desired contact between the magnetic head and the floppy disc.

It is therefore an object of the present invention to provide an improved head carriage for use in a magnetic recording system.

Another object of the present invention is to provide a head carriage to be used with a double sided, flexible magnetic recording medium, the carriage having a pair of magnetic heads disposed in opposed relation which are prevented from being misaligned.

A further object of the present invention is to provide a head carriage provided with at least one magnetic head for use in a magnetic recording system thereby the contact between the magnetic head and the recording medium may be maintained appropriately at all times.

A still further object of the present invention is to provide an improved head carriage for use in a floppy disc system.

A still further object of the present invention is to provide a head carriage which may be used either in a one-sided floppy disc system or in a double-sided floppy disc system with requiring a minimum number of parts to be replaced.

A still further object of the present invention is to provide a head carriage for use in a floppy disc system which is simple in structure and therefore easy to manufacture.

Other objects, advantages and novel features of the present invention will become apparent from the following detailed description of the invention when considered in conjunction with the accompanying drawings.

DESCRIPTION OF THE PREFERRED EMBODIMENTS

Figure 1:
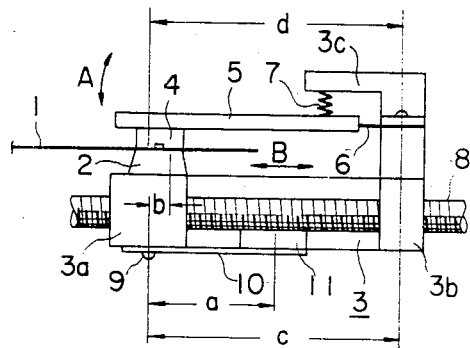
FIG. 1 is a schematic illustration showing the structure of a prior art head carriage when used in a double-sided floppy disc system.

Referring now to FIG. 1 which illustratively shows the structure of a prior art double-sided floppy disc system, the floppy disc 1 is rotatably supported in a manner well known in the art. Although the disc 1 is referred to as a floppy disc hereinbelow, it may include any form of flexible magnetic recording media and it is not intended to limit to the floppy disc alone.

A lower magnetic head 2 is fixedly mounted on a forward portion 3a of a carriage main body 3 and a upper magnetic head 4 is fixedly mounted on a movable arm 5 at its free end. The base end of the movable arm 5 is attached to a resilient plate 6 which, in turn, is fixedly mounted on a backward portion 3b of the carriage main body 3. So that the movable arm 5 may swing in the direction indicated by the double pointed arrow A.

The carriage main body 3 includes a projection 3c which projects toward the forward portion 3a from the top of the backward portion 3b, and a coil spring 7 is provided between the projection 3c and the movable arm 5. Thus, the movable arm 5 and therefore the upper magnetic head 4 are resiliently biased toward the lower magnetic head 2, so that when the floppy disc 1 exists between the two heads 2 and 4, the disc 1 receives a light contact force from these heads 2 and 4.

As shown, the carriage main body 3 is supported to be reciprocatingly movable along the lengthwise direction of a screw shaft 8, which is driven to rotate in a desired direction by means of a stepping motor (not shown). One end of a resilient plate 10 is attached to the forward portion 3a through a fixing element 9, and on the other end of the plate 10 is fixedly mounted a half nut 11 which is in mesh with the shaft 8. Therefore, when the screw shaft 8 is driven to rotate, the carriage main body 3 is caused to move along the lengthwise direction of the shaft 8 as indicated by the double pointed arrow B. The direction of its linear movement depends upon the rotational direction of the shaft 8. The drivement of the shaft 8 is synchronized with the drivement of the disk 1 so that information may be written into or read from both sides of the disk 1 through the upper and lower magnetic heads 2 and 4.

In such a magnetic head carriage assembly, the carriage main body 3 is usually made from a resin, containing a large proportion of teflon in order to enjoy its good self-lubricating property, and thus the material forming the carriage main body 3 as a whole has a larger linear expansion coefficient. On the other hand, since the movable arm 5 is required to be light-weighted and high in stiffness, it is usually made from a resin material containing a substantial quantity of glass fibers. Thus, the material for forming the movable arm 5 has a lower linear expansion coefficient.

As described above, since the carriage main body 3 and the movable arm 5 are made of materials having differing linear expansion coefficients, the relative positional relationship between the two magnetic heads 2 and 4 varies as the ambient temperature changes, causing misalignment. Such a problem is solved by the present invention, two specific embodiments of which will be described with reference to FIGS. 2 and 3 where like numerals are used to indicate like elements as in FIG. 1.

Figure 2:
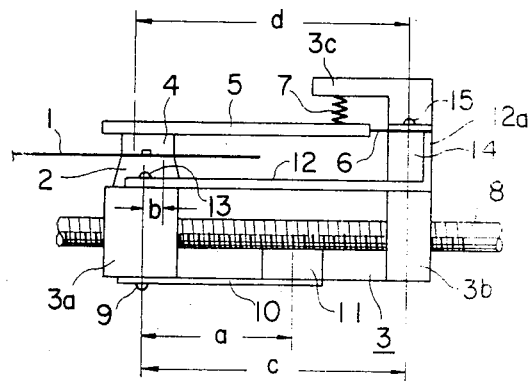
FIG. 2 is a schematic illustration showing the structure of one embodiment of the present invention when applied to a double-sided floppy disc system.

In the embodiment shown in FIG. 2, there is provided an L-shaped plate 12, one end of which is fixed to the forward portion 3a through a fixing element 13. A block member 14 is fixedly mounted on the other end of the plate 12 in contact with a upstanding portion 12a of the L-shaped plate 12. Then the resilient plate 6 for swingably supporting the arm 5 is fixedly mounted on the block member 14. It is to be noted that the fixing element 13 is located vertically above the fixing element 9, and the plate 12 extends horizontally over a distance which corresponds to the distance between the forward and backward portions 3a, 3b. In this case, the L-shaped plate 12 is formed by a material, the linear expansion coefficient of which is substantially the same as that of the material forming the movable arm 5. With such a structure, the relative positional relationship between the two magnetic heads 2 and 4 will be kept unchanged even if the ambient temperature changes.

Now, description will be made as to the difference produced in relative positional relationship between the upper and lower heads 2 and 4 as a function of ambient temperature. First, some parameters will be defined hereinbelow.

a: distance between the fixed point 9 of the plate 10 and the center of the half nut 11.

b: distance between the fixed point 13 of the plate 12 and the gap position of the lower head 2.

c: distance between the fixed point 13 of the plate 12 and the fixed point 15 of the plate 6.

d: distance between the fixed point 15 of the plate 6 and the gap position of the upper head 4.

It is to be noted that the fixed point 13 of the plate 12 and the fixed point 9 of the plate 10 are located on the same vertical line. It is also assumed that the carriage main body 3 has a linear expansion coefficient $\alpha_1$, and, similarly, plate 10, movable arm 5 and plate 12 have linear expansion coefficients $\alpha_2$, $\alpha_3$ and $\alpha_4$, respectively. In the case of the structure shown in FIG. 1, changes $\alpha_1$ and $\alpha_2$ in position of the lower and upper heads 2 and 4, respectively, may be given as shown below, taking the center of the half nut 11 as a reference point when the ambient temperature has risen by $\Delta t$.

$$\delta_1 = (a\alpha_2 - b\alpha_1) \Delta t \qquad (1)$$

$$\delta_2 = (a\alpha_2 + d\alpha_3 - c\alpha_1) \Delta t \qquad (2)$$

Thus, the relative positional variation $\Delta_1$ between the upper 4 and lower 2 heads may be given from the above equations (1) and (2) as follows:

$$\Delta_1 = \delta_1 - \delta_2 = (-b\alpha_1 - d\alpha_3 + c\alpha_1)\Delta t \qquad (3)$$
$$= \{(c - b)\alpha_1 - d\alpha_3\}\Delta t$$

Now, since $c \gg b$, $c - b \simeq c$ and then $c \simeq d$. Thus, the equation (3) may be modified as follows:

$$\Delta_1 \simeq (c\alpha_1 - d\alpha_3)\Delta t \quad (4)$$
$$\simeq c(\alpha_1 - \alpha_3)\Delta t.$$

As is obvious from the above equation (4), variation $\Delta_1$ is proportional to the difference between the linear expansion coefficients $\alpha_1$ and $\alpha_3$. The greater the difference between the two coefficients $\alpha_1$ and $\alpha_2$, the greater the variation $\Delta_1$.

On the other hand, in the case of the structure of the present invention shown in FIG. 2, change $\delta_3$ in position of the upper head 4 due to the temperature increase $\Delta t$ may be expressed as follows:

$$\delta_3 = (a\alpha_2 + d\alpha_3 - c\alpha_4)\Delta t \quad (5)$$

From equations (1) and (5), the relative positional variation $\Delta_2$ between the upper 4 and lower 2 heads in the structure of FIG. 2 may be given in the following manner.

$$\Delta_2 = \delta_1 - \delta_3 = (-b\alpha_1 - d\alpha_3 + c\alpha_4) \quad (6)$$

From equations (3) and (6), we have $$\Delta_1 - \Delta_2 = c(\alpha_1 - \alpha_4). \quad (7)$$

As previously described, the inequality relationship $\alpha_1 > \alpha_4$ normally holds true, so $$c(\alpha_1 - \alpha_4) > 0.$$

Therefore, $\Delta_1 - \Delta_2 > 0$ and $\Delta_2 < \Delta_1$.

The above result indicates that relative positional variation $\Delta_2$ in the present structure shown in FIG. 2 is smaller than variation $\Delta_1$ in the prior art structure shown in FIG. 1 for the same temperature change $\Delta t$.

Figure 3:
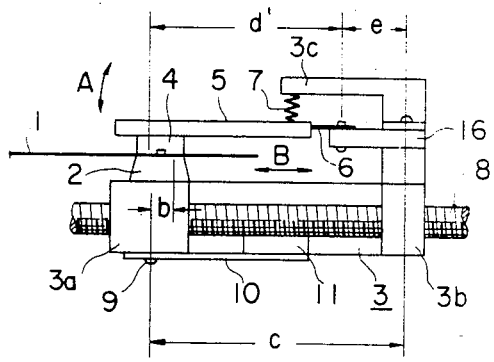
FIG. 3 is a schematic illustration showing the structure of another embodiment of the present invention when applied to a double-sided floppy disc system.

FIG. 3 shows a second embodiment of the present invention in which the misalignment between the upper and lower magnetic heads due to temperature change is prevented from occurring. As shown, this embodiment includes a support member 16 fixedly mounted on the backward portion 3b for resiliently supporting the movable arm 5. Such resilience is given by attaching one end of the resilient plate 6 to the base end of the arm 5, the plate 6 being fixedly mounted on the support member 16.

It is to be noted that the support member 16 is formed by a material having a linear expansion coefficient which is greater than that of the material forming the arm 5. Preferably, the linear expansion coefficient of the support member 16 is greater than that of the carriage main body 3. It should be understood that in the strucure shown in FIG. 3, the support member 16 is provided to function as adjusting means to absorb the differences in expansion or contraction between the carriage 3 and the arm 5. In this sense, the support member 16 corresponds to the L-shaped plate 12 in FIG. 2.

Denoting the linear expansion coefficient of the support member 16 as $\alpha_4$, the relative positional variation $\Delta_3$ in the structure shown in FIG. 3 may be derived as follows:

$$\Delta_3 \simeq \{c\alpha_1 - (d'\alpha_3 + e\alpha_4)\}\Delta t. \quad (8)$$

In the above equation (8), since $\alpha_3 < \alpha_1$, but $\alpha_4 > \alpha_3$, then it is possible to establish the relation $d'\alpha_3 + e\alpha_4 = -c\alpha_1$ by choosing $\alpha_4$ and $e$ appropriately, thereby preventing the occurrence of misalignment between the upper and lower heads completely. Under the conditions, it is preferable that the member 16 is formed by a material having a relatively large linear expansion coefficient such as vinyl chloride.

As set forth above, in accordance with the present invention, the relative positional relation between the upper and lower heads is kept unchanged as much as possible so that positioning of the heads in recording and reproducing operation is significantly improved.

Figure 4:
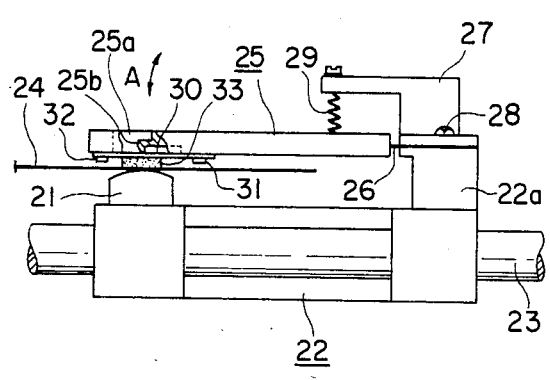
FIG. 4 is a schematic illustration showing a further embodiment of the present invention when used in a single-sided mode.

FIG. 4 shows a further embodiment of the present invention in which a magnetic head 21 is fixedly mounted on a carriage main body 22 at its forward end. The carriage main body 22 is slidably supported by a pair of guide shafts 23 aligned side by side in the direction vertical to the surface of the drawing paper. The head 21 has a rounded apex surface defined, for example, by a part of a spheroid having a 60 mm radius. The apex surface may be brought into contact with the bottom surface of a flexible disc 24 such as a floppy disc.

At the backward end of the carriage main body 22 is provided an upstanding arm supporting section 22a on which is fixedly mounted a spring holder 27 by means of a screw 28. A leaf spring 26 has one end fixedly held between the arm supporting section 22a and the spring holder 27 as the screw 28 is screwed in and the other end firmly attached to the base end of a movable arm 25. Thus, the arm 25 may swing in the direction indicated by the arrow A. A coil spring 29 is provided between the spring holder 27 and the arm 25 so that the arm 25 is resiliently biased toward the magnetic head 21.

Figure 5:
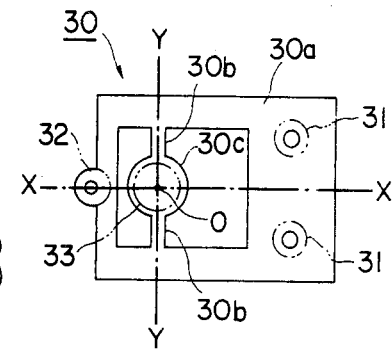
FIG. 5 is a plan view showing on an enlarged scale the support plate for supporting the pressure pad employed in the structure shown in FIG. 4.

Near the free end of the arm 25 is formed an opening 25a in which is provided a needle 25b, which is integral with the arm 25, extending in the downward direction. A gimbal spring 30 made from a leaf spring of 0.05 to 0.1 mm thick is loosely mounted to the bottom surface of the free end section of the arm 25 by means of three screws 31, 31 and 32. The detailed structure of the gimbal spring 30 is best shown in FIG. 5. As shown, the gimbal spring 30 includes a mounting section 30a generally rectangular in shape, a circular section 30c and a pair of bridging sections bridging between the mounting section 30a and the circular section 30c. A pressure pad 33 is fixedly attached to the circular section 30c and thus it is preferable that the circular section 30c is made equal to or slightly larger than the pad 33 to be attached thereto.

The screw 32 for mounting the forward end of the gimbal spring 30 is set such that it is rotated in the reverse direction approximately over a quarter revolution after having screwed in completely, thereby providing some gap between the bottom surface of the arm 25 and the gimbal spring 30. In this manner, loose mounting of the gimbal spring 30 may be established. The gimbal spring 30 is so mounted that the tip of the needle 25b is located at the center O of the circular section 30c. With such a structure, the gimbal spring 30, or more specifically the circular section 30c may take a varying orientation freely.

As described previously, to the circular section 30c is fixed the pressure pad 33 which may be brought into contact with the disc 24 on the opposite side of the head 21. The force of the spring 29 is transmitted to the pad 33 through the arm 25 and the needle 25b, thereby lightly pressing the disc 24 against the head 21. As a result, the contact between the disc 24 and the apex surface of the head 21 can be always maintained at an excellent condition, which, in turn, insures stable operation.

Figure 6:
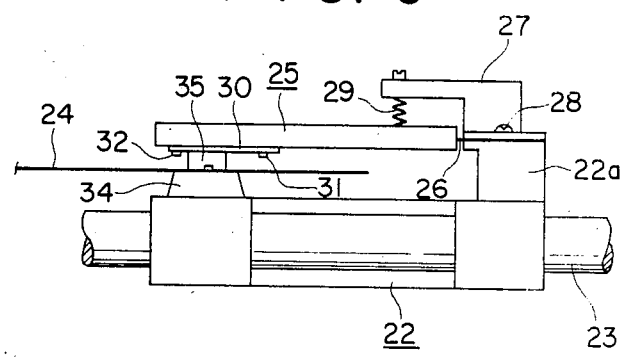
FIG. 6 is a schematic illustration showing the state when the embodiment shown in FIG. 4 is used in a double-sided disc system.

The head carriage shown in FIG. 4 is also advantageous because only the head 21 and the pad 33 need to be replaced for application to the double-sided floppy disc system, and the remaining parts may be commonly used. FIG. 6 shows the case when the present head carriage is employed in a double-sided mode. As shown, the magnetic head 21 having the rounded apex surface is replaced by a magnetic head 34 having a flat apex surface, and the pad 33 is replaced by another magnetic head 35 which also has a flat apex surface. It is to be noted that a combination of the flat top magnetic head 34 and the pad 33 is equally operative as a single-sided operation.

Figure 7:
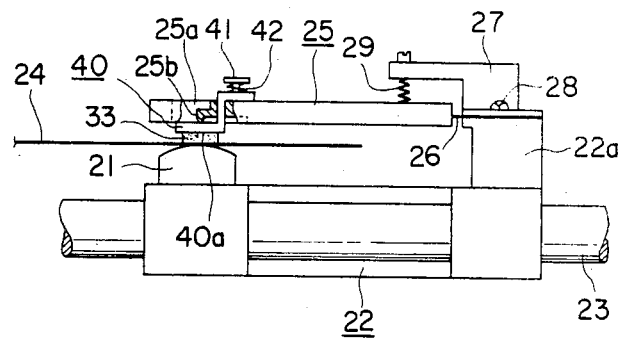
FIG. 7 is a schematic illustration showing a still further embodiment of the present invention when used in a single-sided mode in a floppy disc system.

FIG. 7 shows a further modification of the present invention in which a step-formed plate 40 is provided instead of the gimbal spring 30. As shown, the step-formed plate 40 is inserted into the opening 25a of the arm 25 with its raised portion lying on the top surface of the arm 25 in the periphery of the opening 25a. A hole is provided in the raised portion of the plate 40 and a screw 41 is screwed into the arm 25 through the hole. A coil spring 42 is fitted onto the screw 41 as compressed between the head of the screw 41 and the raised portion of the plate 40. Accordingly, the top surface of the lowered portion of the plate 40 is brought into contact with the tip of the needle 25b.

The pad 33 attached to the bottom surface of the lowered portion of the plate 40 may be brought into contact with the top surface of the disk, thereby imparting a light force thereto as originated from the spring 29. It is to be noted that the plate 40 on the bottom surface 40a thereof may take a varying orientation with the tip of the needle 25b as a fulcrum so that the contact between the head 21 and the disc 24 may be maintained at a desirable condition at all times. It should further be noted that the head carriage of FIG. 7 may be easily modified for use in the double-sided system by replacing only the head 21 and the pad 33, as in the previous embodiment.

While the above provides a full and complete disclosure of the preferred embodiments of the present invention, various modifications alternate constructions and equivalents may be employed without departing from the true spirit and scope of the invention. Therefore, the above description and illustration should not be construed as limiting the scope of the invention, which is defined by the appended claims.

What is claimed is:

1. A head carriage for use in a double-sided recording-/reproducing system comprising:
   a carriage main body supported to be movable in a reciprocating manner and provided with a forward end and a backward end which are spaced apart over a predetermined distance;
   a first magnetic head fixedly mounted on the forward end of said carriage main body;
   a second magnetic head disposed opposite to said first magnetic head;
   an arm extending substantially in parallel with and as long as said carriage main body and having a free end and a base end, said second magnetic head being fixedly attached to the free end of said arm, said arm being comprised of a first material having a first linear coefficient of expansion;
   supporting means having one end fixedly attached to said forward end of said carriage main body and the other end riding on said backward end of said carriage main body to extend approximately in parallel with said arm and having means for resiliently supporting said arm at the base end thereof, said supporting means being comprised of a second material having a second linear coefficient of expansion which is substantially equal to said first linear coefficient of expansion; and
   biasing means for biasing said arm in a predetermined direction to bring said second magnetic head opposite to said first magnetic head.

2. The head carriage of claim 1 wherein said supporting means includes a support plate which extends between said forward and backward ends of said carriage main body as riding thereon and fixedly attached to said forward end, a block member fixedly attached to said plate at a position generally above said backward end, and wherein a resilient member is provided between said block member and the base end of said arm thereby resiliently supporting said arm.

3. The head carriage of claim 2 wherein said supporting plate is provided with an upstanding portion wherein said block member is located.

* * * * *